March 17, 1925.
J. R. ANDERSON
FIGURE WHEELED TOY
Filed Feb. 27, 1922
1,529,859
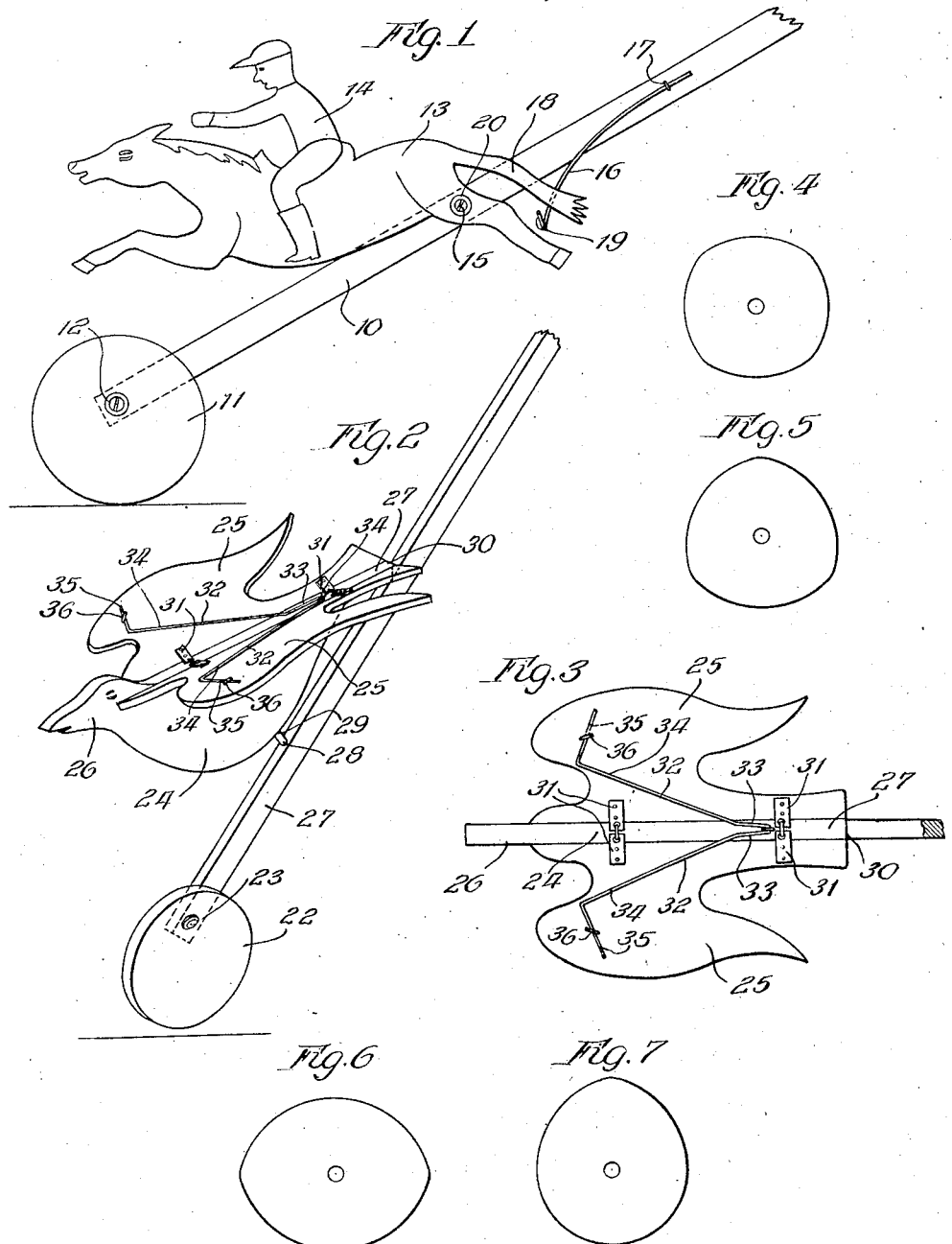

Patented Mar. 17, 1925.

1,529,859

UNITED STATES PATENT OFFICE.

JOHN R. ANDERSON, OF MOLINE, ILLINOIS.

FIGURE WHEELED TOY.

Application filed February 27, 1922. Serial No. 539,388.

*To all whom it may concern:*

Be it known that I, JOHN R. ANDERSON, a citizen of the United States, residing at Moline, in the county of Rock Island and State of Illinois, have invented certain new and useful Improvements in Figure Wheeled Toys, of which the following is a specification.

The principal object of this invention is to provide a toy that will bear sufficient resemblance to animals both in appearance and movement to attract and retain the interest of children.

Another object of the invention is to provide a toy embodying one or more figures representing animal life which will be given proper movement during the motion of the toy to suggest some characteristic action of the living beings represented.

Another object of the invention is to equip such a toy with a rolling element or elements that will produce the bounding or saltatory movement characteristic of the movement of most animals.

Other objects will become apparent as the description is read in connection with the accompanying drawing showing selected embodiments of the invention representing the best form of application of the principles now known to me. In said drawing Fig. 1 is a side elevation of a toy embodying a horse and rider;

Fig. 2 is a perspective view of a similar toy embodying a fowl;

Fig. 3 is a plan view of Fig. 2; and

Figs. 4, 5, 6 and 7 are side elevations of various forms of wheels or rolling elements that may be used.

As illustrated in Fig. 1, the toy includes a staff or handle 10, a wheel 11 journaled on an axle 12 carried by the staff, a horse 13 carrying a rider 14 and pivoted by the pintle 15 to the staff, and a spring 16 fixed to the staff by a staple 17 and passing through the tail 18 of the horse. The horse and rider are cut from a single piece of board or the like, preferably three-ply veneer, and are painted to resemble the corresponding figures in animal life. When made in this manner a single screw 15 with a washer 20 is sufficient to make a free pivotal connection between the hind legs of the horse and the staff 10. In addition, the tail 18 is rigid and forms a convenient arm for co-action with a spring 16 which passes through the tail and has an angular end 19 to prevent the tail from slipping off the spring when the horse revolves clockwise in Fig. 1. In the arrangement shown, the tail 18 slides along the spring 16 when the horse revolves clockwise and resumes the position shown in Fig. 1 upon reverse movement of the horse when the spring binds in the passage through the tail and acts to yieldingly resist further downward movement of the horse's head and front legs.

As shown in Fig. 1, the front end of the staff is mounted upon an eccentric wheel 11, which in rolling along the floor or ground will produce a forward and back and up and down movement of the pivot 15, resulting in a bounding or saltatory movement that will cause the horse to rock about the pintle 15 under the control and by the assistance of the spring 16. The up and down and forward and back movement caused by the eccentric wheel is of such nature and is so timed with relation to the pivotal movement of the horse about the pintle 15 that the horse is given a motion strongly suggestive of the motion of a natural horse in running.

In order to reduce the structure to the simplest form possible, the horse and rider are made in one rigid piece pivoted to a short staff equipped with a single eccentric wheel, but it will be clear that where a more elaborate toy is desired the horse and rider may be separately made and suitably articulated, the staff may take the form of a frame, and the single wheel may be replaced with various forms of rolling supports without departing from the invention.

In Figs. 2 and 3 I have illustrated the invention as applied to a toy embodying a fowl or bird. This construction also includes a staff 21, a wheel 22, and an axle 23. On this staff is mounted a bird comprising a body 24 and pivoted wings 25. The body is conveniently made by sawing a design out of a board and including a head 26 and a tail 27. A screw or stud 28 passing through the staff enters the body piece at 29 in a position corresponding to the legs of the ordinary fowl. Suitable screws or nails 30 connect the tail to the staff and with the screw 28 afford a rigid mounting for the body of the bird.

The wings 25 may also be cut from a flat board in a form suggesting the similar members of a bird and these I preferably pivot to the back of the body portion 24 by freely acting hinges 31. Suitable springs 32 limit the pivotal movement of the wings and give them the spring and snap necessary to simulate the action of a bird's wings. As shown, these springs are formed from a wire bent to form a loop 33 which is secured by a staple 34 to the body of the bird and having arms 34 equipped with angular levers 35 secured at 36 to the wings. This makes a torsional spring which will lie close against the wings and therefore be inconspicuous while affording sufficient metal to permit the desired movement and yet provide the spring and snap necessary to proper suggestion of the movement of a bird's wings.

In this modification also, the saltatory movement caused by the eccentric wheel produces the flapping of the wings and is so timed with relation to the movement of the wings as to cause the entire bird to simulate the motion of a living bird in flight.

In Figs. 4, 5, 6 and 7 I have shown different forms of eccentric wheels that will produce the desired saltatory movement. It is obvious, however, that other forms of wheels will give good results and I wish it understood that these examples are illustrative rather than limiting.

The embodiments of the invention here illustrated are very simple and can be manufactured at a very small cost which will permit them to be sold at a price that will enable merchants to give them as favors to customers purchasing a certain quantity of goods or to sell them at retail in the customary manner. The same principles can be embodied in more elaborate toys which will meet the requirements of other conditions that will warrant sale at higher prices.

Heretofore, so far as I am aware, attempts to make toys simulating the form and action of living animals have included mechanical movements for positively giving motion to the figure or the moving elements of the figure. These mechanical means have been expensive and have been a constant source of difficulty and complaints. As a result, such toys have been expensive and unsatisfactory in service. With my invention, the number of parts is reduced to a very small minimum and the life-like motion of the figures is produced by the characteristic movement of the rolling support. Furthermore, the moving figure or parts of the figure being free to move quickly and springily more closely copy the motion of living animals.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. A toy comprising a staff, a rotary element pivoted to said staff and forming a rolling support therefor, a figure pivotally supported entirely by said staff, means to give a movement to said figure about its pivot, and means to give forward and back and up and down movement to said pivot.

2. A toy comprising a staff, a rotary element pivoted to said staff and forming a rolling support therefor, a member pivotally supported entirely by said staff, means to give movement to said member about its pivot, and means to give forward and back and up and down movement to said pivot.

3. A toy comprising a staff, a rotary element pivoted to said staff and forming a rolling support therefor, a member pivotally supported entirely by said staff, means to give forward and back and up and down movement to said figure and a spring carried by said staff and engaging said member, to govern movement thereof on its pivot.

4. A toy comprising a staff, a wheel eccentrically pivoted to one end of said staff, a member pivotally supported entirely by said staff, a spring carried by said staff and engaging said member at one side of its pivotal support, to govern movement thereof on its pivot.

JOHN R. ANDERSON.